United States Patent Office 3,625,005
Patented Dec. 7, 1971

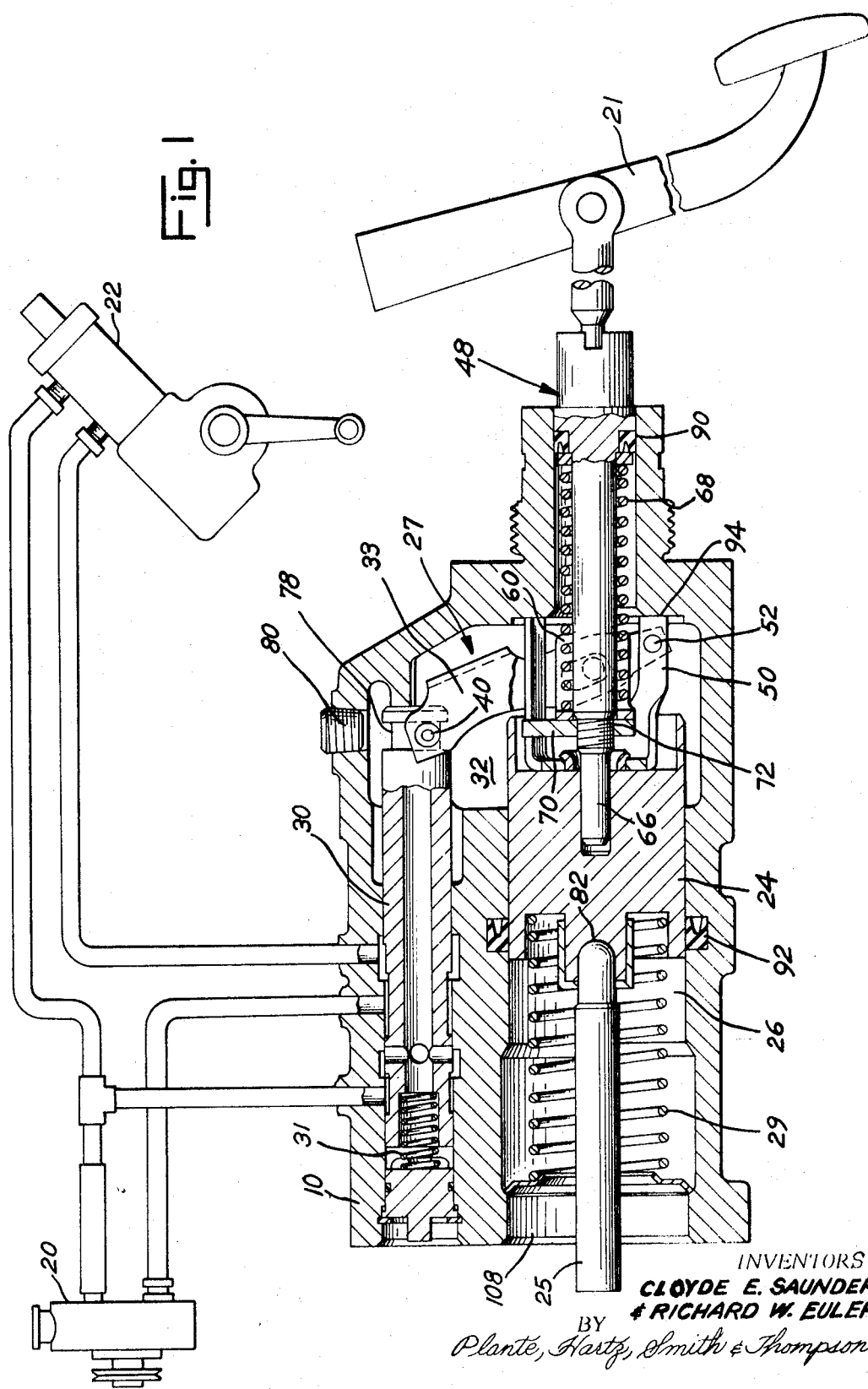

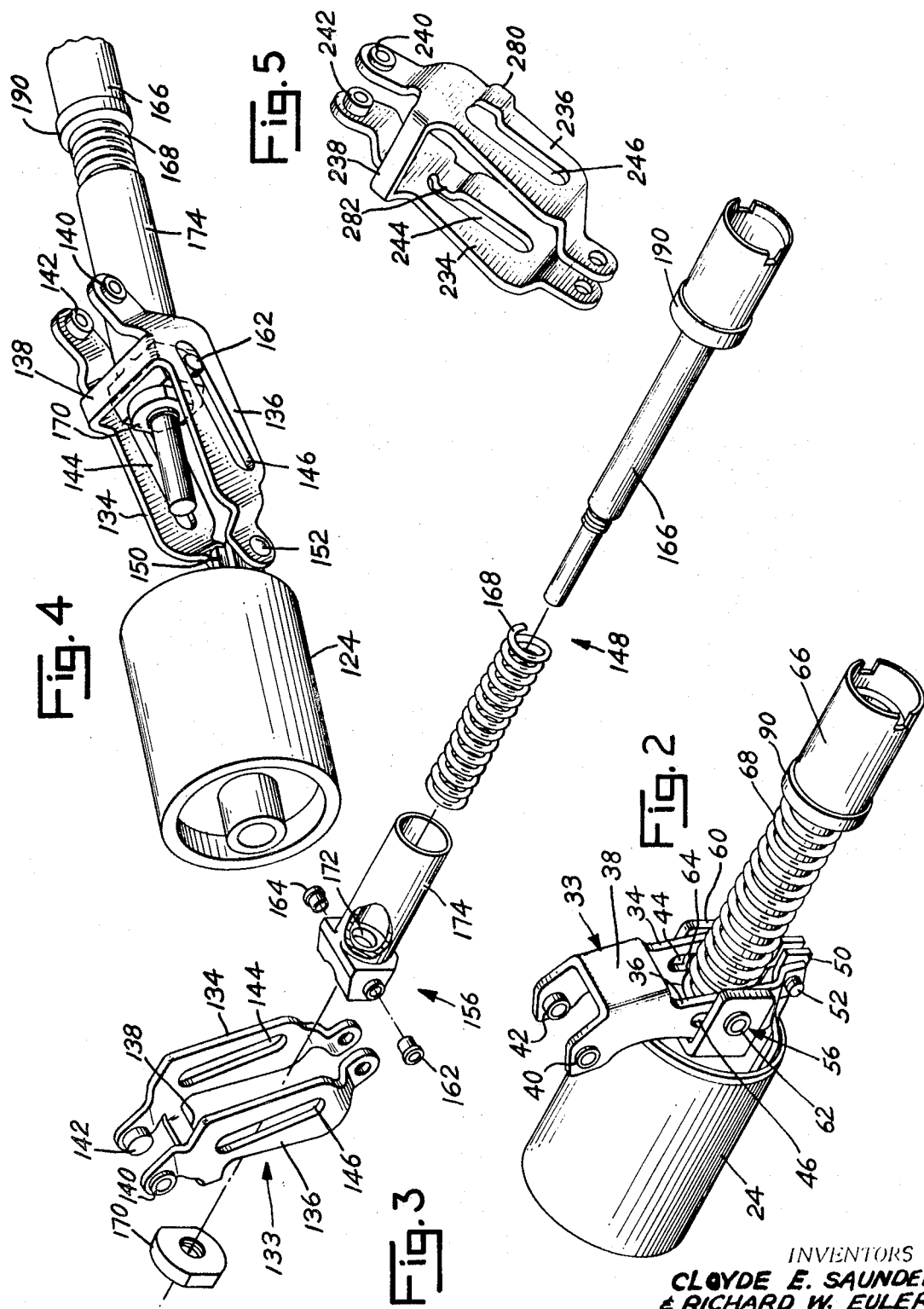

3,625,005
ACTUATING MEANS FOR A BRAKE BOOSTER
Cloyde E. Saunders and Richard W. Euler, South Bend, Ind., assignors to The Bendix Corporation
Filed May 8, 1970, Ser. No. 35,800
Int. Cl. F15b 7/00, 13/10; G05g 1/04
U.S. Cl. 60—54.6
9 Claims

ABSTRACT OF THE DISCLOSURE

A valve actuating mechanism for varying the applied force transmitted to a control valve and a power piston, which includes a support member fixed to the power piston. A lever with elongated slots in its arms is pivotally pinned to the support bracket and secured to the control valve by pins retained in a groove. A force transmitting member carried on an activating rod is connected to the lever by pivot pins slidably retained in the elongated slots. When force is applied by the activating rod, the force transmitting member with the pivot pins being free to move in the slots of the lever arm transmits a force to the piston and valve in proportion to the position of the pivot pins on the lever arm. Thus, the distance traveled by the piston and valve in being actuated will vary in proportion to the distance traveled by the force transmitting member and its location on the lever arms.

BACKGROUND OF THE INVENTION

This invention relates to a valve actuating mechanism and method of installation in a power boost assembly operated by fluid from a single pump supplying fluid to several devices.

In the prior art, lever means have been disclosed which provide valve actuating mechanisms wherein the proper force ratio needed to operate a power brake assembly changes when power is unavailable, for example see U.S. Patent application Ser. No. 793,923, filed Jan. 16, 1969, and U.S. patent application Ser. No. 14,133, filed Feb. 25, 1790, incorporated by reference, assigned to the common assignee of this invention.

However, the force transferring member of these actuating mechanisms was not fixedly connected to the lever arms which transmitted the applied force to the valve and power piston. Thus, when the operator released the actuating means, positive control over the piston and valve was not assured. Furthermore, in assembly of the power booster mechanism, the actuating rod carrying the bracket member was first inserted in the power chamber and sealed in the bearing wall. Then the power piston and lever were inserted in the chamber opposite the bearing wall and internally joined to the actuating rod. In assembling the actuating rod to the piston inside the housing, visual inspection was impossible and a positive joint was never assured. Moreover, assembly of the prior art unit outside the housing could not be achieved since the pivoted lever arms would be nearly in a vertical position after securing the actuating rod assembly to the lever arms thereby making it impossible to insert it through the power chamber.

SUMMARY OF THE INVENTION

In order to overcome the inconveniences of the prior art, we have invented an improved valve actuating mechanism which can be assembled outside the housing thereby allowing visual inspection. Additionally, we have provided the means by which the applied force supplied by the actuating means to the power piston and spool valve means is continually changed in accordance with a movement by the actuating means.

It is therefore an object of this invention to provide a valve actuating mechanism which will freely operate the power piston at all times.

Another object of this invention is to provide a valve actuating mechanism pivotally connected to a power piston through suitable linkage which transmits an applied force from a slidable actuating means.

A further object of this invention is to provide the means whereby the assembly of the power piston means and actuating means takes place outside of the housing.

A still further object of this invention is to provide the means whereby the distance traveled by the power piston and valve means varies in proportion with the position of the force transmitting means on the lever and the distance traveled by the input device.

These objects and others will be readily understood by those skilled in the art from the drawings and the following description of the embodiments shown therein.

BRIEF DESCRIPTION OF THE DRAWINGS

FIG. 1 is a sectional view of a hydraulic brake booster shown in association with a vehicle hydraulic power steering system which is shown schematically;

FIG. 2 is a perspective view of the power piston, actuating rod, and linkage means of the brake booster shown in FIG. 1;

FIG. 3 is an exploded view of another embodiment of an actuating mechanism and linkage means for a brake booster;

FIG. 4 is a perspective view of a power piston, linkage means, and actuating rod of the FIG. 3 embodiment shown in a position ready for assembly; and FIG. 5 is a perspective view of still another embodiment of a lever arm with loading slots therein for ease in assembly.

DESCRIPTION OF THE EMBODIMENTS

In the hydraulic system shown in FIG. 1 a single pump 20 supplies the fluid pressure to operate a power brake booster 10 and a power steering device 22. The fluid pressure from the pump is controlled by a spool valve 30 of the type disclosed in U.S. patent application Ser. No. 14,133, filed Feb. 25, 1970, and assigned to the common assignee of this invention and incorporated herein by reference. The spool valve 30 is connected to the power boost piston 24 in the power chamber 26 by linkage means 27. The applied force from an operator is supplied from an actuating means 48 through slidable bracket type force transmitting means 56 (see FIG. 2) to the linkage means 27. Since the force transmitting means 56 is free to move on the linkage means 27, the applied force transmitted to the spool valve 30 and power boost piston 24 varies in accordance with its position on the linkage means 27. When the spool valve 30 is moved by actuating means 48, to the left viewing FIG. 1, fluid pressure from the pump is communicated into control chamber 32 to act on the power boost piston 24 operatively connected by push rod 25 to a master cylinder (not shown) which activates the brakes on a vehicle. When the brake pedal 21 of the actuating means 48 is released, the spool valve 30 and piston 24 are returned to their rest position by their respective springs 29 and 31.

In the event that either the spool valve member 30 or the piston member 24 would happen to malfunction, movement of actuating means 48 will cause force transmitting means 56 to slide on the linkage means 27 to independently actuate the other member.

The linkage means 27 connecting the power piston 24 to the spool valve 30 consists of lever means 33 and a support member 50. The lever means 33 is made up of lever arms 34 and 36, see FIG. 2, containing slots 44 and 46, brace member 38 separating the arms, and pivot pins 40, 42 and 52, the last of which is attached to support member 50 which is secured to the power piston 24.

The force transmitting means 56 consists of a U-shaped retainer 60 having pivot pins 62 and 64 attached to the leg portions while the base contains an axial opening 72 which receives rod 66 of the actuating member 40. The U-shaped retainer is positioned adjacent resilient member 68 carried on the actuating means 48 and held in position by keeper member 70.

When the operator of the vehicle depresses the brake pedal, the actuating rod 66 moves to compress spring 68. The applied force is now transferred from the compressed spring 68 to the pivot pins 62 and 64 of the U-shaped retainer 60. The location of the pins 62 and 64 in slots 44 and 46 will determine the amount of force received by the spool valve 30 and power piston 24. Normally, the applied force will close the spool valve first and the lever arms 34 and 36 will pivot on pins 40 and 42 allowing pivot pins 62 and 64 to slide in slots 44 and 46 permitting an increasing amount of applied force to be transmitted to the power piston. Since the pivot pins 62 and 64 will move in a line parallel to the actuating rod 66, the point of application on the lever arms 34 and 36 will be continually changing as the lever arms move through an arc around the pivot pins 40 and 42. When the brake pedal is released, the positive connection of the lever means 33 will cause both the spool valve 30 and power piston 24 to return to the rest position.

In the event the spool valve 30 should malfunction and the operator is required to manually supply the force needed to operate the master cylinder, the pivot pins 62 and 64 will move in slots 44 and 46 permitting the applied force to be transmitted directly to the power piston 24 without binding.

Through the above embodiment, we have provided a brake booster with the means whereby the force needed to move the piston member and valve means an actuating distance for supplying the brake booster with fluid pressure will vary in accordance with the distance traveled by the actuating rod in response to an operator applied force and the location of the force transmitting means on the lever means.

In the embodiment shown in FIGS. 3 and 4 those elements which are the same as those in FIGS. 1 and 2 are designated by the same reference numbers plus 100 whereas in the FIG. 5 embodiment they are designed by the same numerals plus 200.

The embodiment shown in FIGS. 3 and 4 is the same as the embodiment of FIGS. 1 and 2, except the force transmitting means 156 has been formed as a unitary retainer member 174 and in the lever means 133 the slots 144 and 146 have been elongated while brace 138 has been placed on the opposite side of the lever arms 134 and 136. Pivot pins 162 and 164 are fixed in retainer member 174 and slidable in elongated slots 144 and 146 to provide the structural means to vary the applied force, as fully described above with reference to FIGS. 1 and 2.

The embodiment shown in FIGS. 3 and 4 substantially aids in assembly of the power booster 10 as follows: A spool valve 30 of a type described in the aforementioned U.S. pat. application Ser. No. 14,133 is inserted in the valve chamber 29, while the piston 24 with lever means 133 is connected to actuating means 148 in the following manner.

The power piston 24 is connected to the lever arms 134 and 136 by pivot pin 152 being fixed on support member 150. Now spring 168 of the actuating means 148 is compressed and placed on rod 166 adjacent seal 190. Then rod 166 is inserted in opening 172 of retainer member 174 whereupon keeper 170 is attached to complete the assembly of the force transmitting means. The retainer member 174 is placed inside lever arms 134 and 136 and aligned with slots 144 and 146 so that pivot pins 162 and 164 may be fixed to the force transmitting means 156. The pivot pins 162 and 164 are moved in the slots 144 and 146 until the lever means 133 is in an axially aligned position with respect to the piston 24 and actuating means 168 (as shown in FIG. 4) and placed in chamber 26, containing seal 92, of the power boost assembly 10. This unit is now moved in chamber 26 until pins 140 and 142 are opposite groove 78 of the spool valve 30 when viewed through inspection opening 80 in the power booster 10. By applying opposing forces to the piston 24 and actuating rod 166 the pivot pins 162 and 164 of the retainer member 174 will slide in slots 144 and 146. When the pivot pins 162 and 164 reach the end of slots 144 and 142, further opposing force will cause lever means 133 to pivot around pin 152 to bring pins 140 and 142 into engagement with groove 78 of the spool valve 30. Further pressure is applied to the power piston until the support member 50 abuts wall 94 of the housing of the unit. The booster assembly is then completed by inserting a master cylinder push rod 25 into recess 82 of piston 24. A return spring 29 surrounds push rod 25 and is retained in chamber 26 by snap ring 108. This assembly is now ready to be attached to a master cylinder (not shown).

Through the lever embodiment shown in FIG. 5, the actuating means 148 with the fulcrum pins 162 and 164 can be assembled alone and inserted through loading grooves 280 and 282 into the slots 244 and 246 to form the linkage assembly of the unit. By having the loading slots 280 and 282 in the lever arms 234 and 236, the fulcrum pins 162 and 164 can be fixed to the retainer member 174 without the step of aligning the pin holes in the slots 144 and 146, as described in the assembly above, thereby providing a saving of time in the assembly of the booster unit.

We claim:

1. In a power boost assembly having actuator means, valve means and piston means, a mechanism for varying the force transmitted from said actuating means to said valve means and said piston means, said mechanism comprising:

support means operatively connected to said piston means;

a lever member pivotally connected to said support means and said valve means, said lever member being adapted to move and operate said valve means;

resilient means connected to said actuator means for carrying an input force from an operator;

a retainer member carried by said actuator means for receiving and transmitting said input force from said resilient means to said lever member;

slot means located in one of said members; and pivot pin means fixed to the other of said members and positioned in said slot means for permitting relative movement between said members to vary the location through which the input force is communicated for operating the valve means and piston means.

2. In the power boost assembly, as recited in claim 1, wherein said slot means is in the lever member and said pivot pin means is located in the retainer member.

3. In the power boost assembly, as recited in claim 2, wherein said lever member includes a pair of parallel arms and said slot means includes a pair of elongated slots one of which is located in each of said arms.

4. In the power boost assembly, as recited in claim 3, wherein said arms each have a loading groove adjacent each of said elongated slots for positioning said pivot pin means in said elongated slots.

5. In the power boost assembly, as recited in claim 4, wherein said retainer member includes:

a first leg;

a second leg;

a base connecting the first leg with the second leg, said base having an axial opening permitting said actuating means to move therein upon applying a sufficient force to compress the resilient member; and a keeper member for securing said retainer member on said actuating means.

6. The power boost assembly, as recited in claim 5, wherein said connector means includes:

a first pivot pin attached to said first leg; and a second pivot pin attached to said second leg, said first and second pivot pins transferring the input force received through said resilient member from an operator to said lever means.

7. An actuating mechanism in a power booster for moving a power piston and a valve a different actuating distance in response to movement of an input device, said mechanism comprising:

an arm member with one end pivotably connected to said power piston and the other end pivotably connected to said valve, said arm member having slot means;

retainer means slidably connected to said input device;

a resilient member carried by said input device, said resilient member acting on said retainer means to transfer movement from the input device to said retainer means; and pivot pins fixed on said retainer means for transferring movement of said retainer means to said arm member, said pivot pins sliding in said slot means of the arm member as said retainer means moves in response to movement of said input device to vary the ratio between the distance traveled by the input device with respect to said power piston and said valve.

8. A power boost assembly, comprising:

a housing having a valve chamber, a power chamber and a control chamber therein;

valve means located in said valve chamber, said valve means having a groove extending into said control chamber;

a piston member located in said power chamber;

a lever element pivotally connected to said piston member;

actuating means controlled by an operator;

a resilient member positioned on said actuating means for transmitting an operator applied force from said actuating means;

a retainer element with an axial opening positioned on said actuating means, said retainer element being biased by said resilient member to receive said operator applied force, said axial opening permitting said actuating member to move with respect to said retainer element when said resilient member is compressed by said operator applied force;

elongated slot means located in one of said elements; and pivot pins fixed on one of said elements and positioned in said elongated slot means, said elongated slot means permitting said pivot pins to slide therein in order that said lever element will be in an axially aligned position with respect to said piston member and said actuating means for inserting and moving same into said power chamber until said lever element is opposite said groove of said valve means and for permitting the application of opposing forces to said actuating means and said piston member to cause said retainer element to pivot into engagement with said groove of said valve means.

9. A power boost assembly, comprising:

a housing having a valve chamber, a power chamber and a control chamber therein;

valve means in said valve chamber, said valve means having a groove extending into said control chamber;

a piston member;

lever means pivotably connected to said piston member, said lever means having elongated slot means;

actuating means controlled by an operator;

a resilient member positioned on said actuating means for transmitting an operator applied force from said actuating means;

a retainer member with an axial opening positioned on said actuating means biased by said resilient member to receive said operator applied force, said axial opening permitting said actuating member to move with respect to said retainer member when said resilient member is compressed by said operator applied force;

pivot pins fixed on said retainer member and positioned in said elongated slot means, said elongated slot means permitting said pivot pins to slide in order that said lever means will be in an axially aligned position with said piston member and said actuating means for inserting and moving same into said power chamber until said lever means is opposite said groove of said valve means and for permitting the application of opposing forces to said actuating means and said piston member to cause said retainer member to slide in said slot, and said lever means to pivot, on said piston member, into engagement with said groove of said valve means; and pin means on said lever means for connecting said lever means in said groove with said valve means, said pin means transferring movement from said lever means, in response to said operator applied force to said valve means, said movement of said valve means thereby regulating the fluid flow from a source to said control chamber.

References Cited

UNITED STATES PATENTS

| | | | |
|---|---|---|---|
| 3,064,431 | 11/1962 | Schnell | 60—52 B |
| 1,926,634 | 9/1933 | See et al. | 74—516 |
| 2,766,732 | 10/1956 | Schultz | 60—54.6 X |

MARTIN P. SCHWADRON, Primary Examiner

A. M. ZUPCIC, Assistant Examiner

U.S. Cl. X.R.

60—54.6 R; 74—516, 518; 91—391, 469